July 18, 1939.  W. W. KNIGHT  2,166,597
RUBBER CURING APPARATUS
Filed Sept. 24, 1934
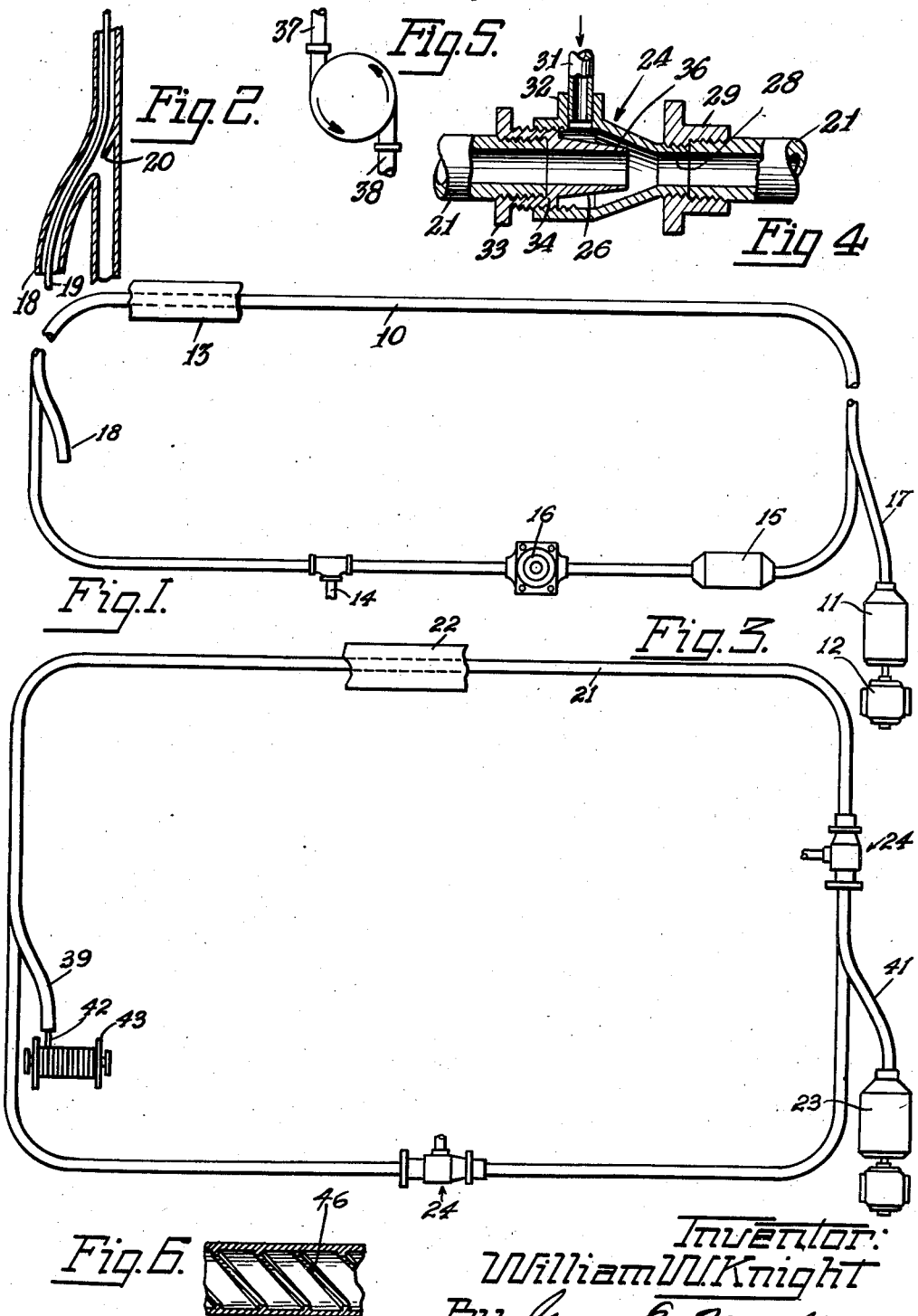
Inventor:
William W. Knight
By George E. Mueller
Atty.

Patented July 18, 1939

2,166,597

UNITED STATES PATENT OFFICE 2,166,597

RUBBER CURING APPARATUS

William W. Knight, Evanston, Ill., assignor to Roth Rubber Company, Cicero, Ill., a corporation of Illinois Application September 24, 1934, Serial No. 745,259

7 Claims. (Cl. 18—6)

My invention relates in general to the curing of rubber cord stock, and more in particular to an apparatus for accomplishing this result.

One of the features of my invention is the curing of rubber cord and particularly sponge rubber cord by passing it through a conduit carrying a flowing stream of hot water, and is directed more particularly to an improved method of curing sponge rubber stock of the character referred to, and over the method shown in Patent No. 2,019,489 issued November 5, 1935, on Sponge rubber and method of manufacturing same, to Charles F. Flemming.

Although I preferably use flowing water to carry the stock through the conduit, I also employ a conduit as shown herein in which the water does not flow and the stock is driven through the tube by the action of the extruding machine.

It is an object of my invention to provide an improved apparatus and process for curing sponge rubber stock.

A further object is to provide an apparatus for this purpose of such construction as to enable minute control of the process and insure a uniform product.

It is also an object to provide a curing apparatus which may be installed in a relatively small amount of space and positioned so as to be out of the path of the ordinary movement over the factory floor; and A still further object is to provide a relatively simple apparatus which is inexpensive both in the initial cost and in the cost of maintenance.

Other objects and advantages will be apparent from the following detailed description taken with the drawing, in which:

Fig. 1 is a top plan view, somewhat diagrammatic, of the complete apparatus of my invention.

Fig. 2 is a side elevation in section of the conduit outlet and adjacent conduit portion.

Fig. 3 is a top plan view, somewhat diagrammatic, of a modified embodiment of my invention.

Fig. 4 is an enlarged sectional view of a steam injector for the embodiment of Fig. 2.

Fig. 5 is a modification of the steam injector of Fig. 3 illustrating a construction for tangential introduction of steam into the closed conduit.

Fig. 6 is a fragmentary sectional view of a modification of the interior of the conduit with angularly extending fins to impart rotary motion to the liquid.

In practicing my invention I provide an elongated closed conduit for carrying heated fluid, preferably water, means for heating the fluid, and means for maintaining a constant flow of the same, with a rubber tubing or extruding machine positioned and connected for discharging rubber cord stock or rubber ball stock into the closed conduit where it is carried along by the moving fluid to cure the stock, and an outlet for removing the cured product from said conduit. The length of the conduit and the temperature and speed of movement of the fluid and rubber cord are proportioned to the time necessary for curing the sponge rubber stock being processed.

The particular fluid employed may also enter into the computation. As explained, I preferably use water in my apparatus to accomplish the curing, but it is understood that I may also utilize the apparatus of my invention when using other well-known liquids for curing rubber.

Referring now to the drawing, a closed conduit 10 is provided which may comprise ordinary iron pipe of suitable diameter to accommodate the sponge rubber stock to be cured and provide sufficient water space around the cord after it is blown and cured. The rubber cord stock is fed directly into the conduit from a tubing machine 11 using a die of the design required for the stock to be cured. The tubing machine 11 is of the ordinary construction and motor operated, in this illustration, by motor 12. The pipe constituting the closed conduit in processing the rubber may be installed around the edges of a room or over the floor in such a way as to not interfere with the movement of trucks and the like through the factory, the first straight section after the entering portion 17 being preferably of a length to hold the cured rubber straight.

When superaccelerator treated sponge rubber stock is being treated, the temperature of the water used in the curing process is preferably maintained close to boiling temperature, and I insulate the pipe with any suitable insulation 13, not only to assist in maintaining the temperature constant, but also to provide protection against burning by anyone touching the apparatus. The insulation is shown only over a short section of the pipe, but is preferably placed over the full length.

In general the curing process for superaccelerator treated sponge rubber stock requires the movement of the stock through boiling water and preferably submerged in the water during the entire blowing and curing period. The stock is kept moving through the water, and as the process is practiced at the present time in a large tank, it is passed through the tank for the required period. With the use of my closed conduit 10, I introduce hot water through an inlet 14 and then heat the water further by means of a gas heater or the like 15 to maintain it at boiling temperature or 212° F. A rotary pump 16 is cut into the line to maintain a constant rate of flow of the water throughout the entire system. The speed of the pump and the length of the closed conduit are proportioned to the time required to effect the curing of the sponge rubber. This curing time ordinarily is from three to five minutes and would represent the time required for the stock to be carried from the inlet 17 to the outlet 18.

In practicing the invention a full head of water is maintained in the conduit 10. The tubing machine 11 with the opening into conduit inlet 17 are positioned high enough above the conduit to prevent the escape of water at this point. The cord stock is fed downwardly into the conduit. The outlet 18 extends upwardly out of the conduit as shown particularly in Fig. 2. However, I may open the outlet at a point lower than the opening of inlet 17, and permit a small volume of water to escape to lubricate said outlet for movement of the cord stock 19 therethrough. A small deflector 20 is positioned in the conduit to guide the cord stock into the outlet but so designed as not to interfere with the flow of water through the pipe.

In the event that rubber balls are being cured, or individual objects rather than the rubber cord, the former are of course carried through the conduit in the same manner as the cord, and pushed out through the opening 18 to be collected in a suitable receptacle.

Although I have represented the apparatus with a single heater, a single pump, and a single tubing machine opening into the closed conduit or channel 10, it is understood that I contemplate an apparatus of this type with an elongated channel in which several pumps and tubing machines may be utilized. More than one heater may also be used to maintain the temperature at 212° F.

As to the arrangement of the conduit 10, inlet 17 and outlet 18, these may be placed on different floors with the extruding machine 11, inlet 17 and outlet 18 on an upper floor, and the conduit 10 on a lower floor.

A modified embodiment of my invention is illustrated in Figs. 2 to 4, in which a closed conduit 21, identical with conduit 10, is provided and covered with insulation 22 over the length thereof as previously described. In this embodiment I utilize live steam for heating the water in the channel and use the steam pressure for maintaining a uniform flow of water over the entire device. A tubing machine 23 similar to machine 11 is used for forming the rubber cord stock and discharges the stock into the conduit in the manner previously described.

The steam is introduced into the pipe 21 through a nozzle 24 shown particularly in Fig. 4 and connected into the line as shown in Fig. 3. The nozzle comprises a housing 26 internally threaded at one end and extending through a tapered portion 27 to a constricted opening having external threads thereon at the other end. The neck or outlet portion 28 is of the same diameter as the inside diameter of the conduit 21 and is connected thereto by a coupling 29.

Steam enters the nozzle through a pipe 31 connected into a vertically extending walled opening 32 which itself opens directly into the body portion 26 of the nozzle. The body portion has an inside diameter large enough to permit the insertion of an externally threaded coupling 33 between the pipe or conduit 21 and the inside of the nozzle to rigidly connect said nozzle into the rubber curing channel. The coupling 33 is also threaded internally on its body portion, and has an annular shoulder 34 adapted to seat against the end of the pipe 21 with a forwardly extending nozzle 36 having an inside diameter equal to the inside diameter of the pipe 21. The outside surface of the portion 36 tapers slightly over its length and, fitting into the enlarged body portion 26 at the nozzle, provides an open space or chamber around the outside thereof. Furthermore, the portion 36 of the coupling is of such a length that an annular opening is provided between the periphery of said portion and the conical neck 27 of the nozzle.

In the operation of this portion of the apparatus, steam is introduced through the inlet 31 into the chamber provided between the coupling and the body portion of the nozzle and with the outside surface of the portion 36 of the coupling tapered and the nozzle itself tapering to a constricted opening into the conduit 21, the steam first is injected with a whirling action into the body portion of the nozzle and then projected with a somewhat Venturi effect into the water flowing in the conduit 21. This steam injection properly regulated has been found to give the necessary speed to the movement of the water, and inasmuch as live steam is introduced, the water is maintained at boiling temperature by means of thermostatic control as will be hereinafter discussed. With the use of this apparatus the main heater and the pump of the preceding embodiment are eliminated. It has been found, however, that it is sometimes necessary to introduce a supplemental heater at some portion in the line. However, whether or not this is necessary is dependent partly on the temperature conditions of the room in which the apparatus is installed, and also upon the length of the conduit 21.

It is also advantageous, particularly in the case of the curing of sponge rubber balls, to provide a whirling action to the heated water flowing in the channel, as well as the ordinary forward flow. This can be accomplished by introducing steam into the nozzle of Fig. 5 through inlets 37 and 38 entering the body portion tangentially as shown in Fig. 5. This produces a whirling action to the water, which assists, for instance, in curing a rubber ball to a perfect spherical form.

A modification of the conduit is illustrated in Fig. 6 wherein a plurality of spaced angularly disposed ribs or fins 46 are provided on the inside of the conduit. With this construction a rotary motion is imparted to the water or liquid with the results in curing heretofore explained.

When utilizing steam in the embodiment of Fig. 3, there is some amount of condensation of this steam over the length of the conduit, resulting in excess fluid being added to the normal volume such as to increase the pressure in the conduit beyond that desired. The pressure is relieved by a discharge of the excess fluid through the outlet 39. The outlet 39 and the inlet 41 are of the same construction as the corresponding parts of the apparatus of Fig. 1. The excess fluid lubricates the outlet 39 and facilitates the passage of the cord stock 42 therefrom.

The cured rubber cord may be conveniently wound on a reel 43 as it emerges from the outlet 39. The same expedient may be utilized in the apparatus of Fig. 1.

It is understood of course that the heating, both by means of the heater 17 in the embodiment of Fig. 1, and by steam in the embodiment of Fig. 2 is regulated with a satisfactory thermostat. That is, the temperature is maintained constant over the entire length of the rubber curing conduit or channel. With the apparatus described I am able to maintain a constant flow of hot water in a continuous stream at a uniform rate of speed. This condition, coupled with uniform temperature of the water, provides for uniform curing throughout the entire process.

In the present apparatus the stretching of the rubber cord is prevented and the cured stock is maintained uniform in cross section by being carried along with the flowing water at a uniform rate of speed. Likewise there are no diverse currents to distort a spherical object or the like during the curing operation. With the entire process more minutely controlled as is possible with my apparatus, the curing time may be reduced slightly, making the process more efficient and giving a more satisfactory product. The apparatus itself is very simple and substantially fool-proof, so as to require the minimum amount of maintenance. As previously stated, it is of such construction that it may be installed out of the path of the ordinary movement of the factory so as not to take up valuable floor space.

Although I have described my invention in its preferred embodiments, it is understood that I do not limit myself thereby, but limit the invention only by the scope of the appended claims.

I claim:

1. An apparatus for curing rubber including a liquid receiving conduit, a tubing machine for projecting rubber stock into the conduit, means for injecting steam into said conduit to heat the liquid therein and to move said heated liquid through said conduit to carry the rubber stock therewith, and an outlet from the conduit for removing the stock after completion of the curing operation.

2. An apparatus for curing rubber including a liquid receiving conduit, means for supplying rubber stock to the conduit to be cured in the liquid, means for moving said liquid through the conduit to carry said rubber therewith, said means comprising a steam injector including an enlarged annular housing for connection into the conduit line tapering forwardly to an inside diameter equal to the inside diameter of the conduit, a steam inlet opening in the wall of the housing, and a coupling for connecting the housing having a forwardly extending nozzle opening into the housing for carrying the liquid stream, whereby steam is injected through the inlet into the liquid stream to move the same through the conduit.

3. An apparatus for curing rubber including a liquid receiving conduit, means for heating said liquid in the conduit, means for supplying rubber stock to the conduit to be cured in the liquid, means for propelling said liquid through said conduit with a rotary motion, and an outlet for removing the rubber stock upon completion of the curing operation.

4. An apparatus for curing rubber including a liquid receiving conduit, means for supplying rubber stock to the conduit to be cured in the liquid, means for injecting steam into said conduit in a manner to propel said liquid through the conduit with a rotary motion, and an outlet for removing the rubber stock upon completion of the curing operation.

5. An apparatus for curing rubber including a liquid receiving conduit, means for heating said liquid in the conduit, means for supplying rubber stock to the conduit to be cured in the liquid, means for propelling said liquid through the conduit, directing means on the inside wall of the conduit to provide a rotary motion in the liquid stream, and an outlet for removing the rubber stock upon completion of the curing operation.

6. An apparatus for curing rubber, including a liquid receiving conduit, an extruding machine for projecting rubber stock into said conduit, means for circulating liquid through said conduit and for heating said liquid, including means for injecting steam into said conduit to heat the liquid therein, and an outlet from said conduit for removing the stock after completion of the curing operation.

7. An apparatus for curing rubber, including a liquid receiving conduit, means for feeding rubber stock into said conduit, means for feeding steam into said conduit to heat and propel the liquid therein to move the rubber stock with said liquid, and means for removing the rubber from said conduit.

WILLIAM W. KNIGHT.